United States Patent
Yorifuji et al.

(10) Patent No.: US 10,262,485 B2
(45) Date of Patent: Apr. 16, 2019

(54) PORTABLE TERMINAL AND FUNCTION MANAGEMENT SYSTEM

(71) Applicant: FUJITSU LIMITED, Kawasaki-shi, Kanagawa (JP)

(72) Inventors: Masami Yorifuji, Akashi (JP); Maho Tamai, Nagano (JP); Masanori Kimura, Mishima (JP); Masafumi Matsumura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/864,032

(22) Filed: Jan. 8, 2018

(65) Prior Publication Data

US 2018/0286161 A1 Oct. 4, 2018

(30) Foreign Application Priority Data

Mar. 31, 2017 (JP) .................. 2017-073102

(51) Int. Cl.
  *G06F 8/61* (2018.01)
  *C07C 9/00* (2006.01)
  *G06F 21/50* (2013.01)
  *G07C 9/00* (2006.01)

(52) U.S. Cl.
  CPC .......... *G07C 9/00857* (2013.01); *G06F 8/61* (2013.01); *G06F 21/50* (2013.01)

(58) Field of Classification Search
  CPC ...... G07C 9/00309; G07C 2009/00769; G07C 9/0011; G07C 9/00571; G07C 9/00007; G07C 2209/63; G07C 2009/00793; G07C 9/00896
  USPC ........................................................ 340/5.61
  See application file for complete search history.

(56) References Cited

U.S. PATENT DOCUMENTS

| | | | | |
|---|---|---|---|---|
| 8,417,258 | B2* | 4/2013 | Barnes, Jr. ......... | G06Q 10/1053 455/456.1 |
| 9,609,022 | B2* | 3/2017 | Gupta ..................... | H04L 63/20 |
| 9,800,762 | B2* | 10/2017 | Yamada ................. | H04W 76/14 |
| 9,824,515 | B2* | 11/2017 | Klein .................. | G07C 9/00007 |
| 9,972,144 | B2* | 5/2018 | Klein .................. | G07C 9/00007 |
| 2003/0188199 | A1* | 10/2003 | Tadano .................... | G06F 21/35 726/35 |
| 2008/0289018 | A1* | 11/2008 | Kawaguchi ............. | G06F 21/62 726/9 |

FOREIGN PATENT DOCUMENTS

| | | |
|---|---|---|
| JP | 2003-288275 | 10/2003 |
| JP | 2008-160753 | 7/2008 |
| WO | 2005/073843 | 8/2005 |

* cited by examiner

*Primary Examiner* — Mark S Blouin
(74) *Attorney, Agent, or Firm* — Fujitsu Patent Center

(57) ABSTRACT

A portable terminal includes a memory and a processor coupled to the memory. The processor is configured to: set a function associated with a visitor to be executable, and determine whether or not execution of a function is permitted using information on a location of the portable terminal when an instruction to execute the function is received.

11 Claims, 17 Drawing Sheets

FIG. 3

| VISITOR ID | VISITOR NAME | COMPANY AFFI-LIATION | FACE PHOTOGRAPH | TARGET SYSTEM | TASK ITEM |
|---|---|---|---|---|---|
| E001 | MR. A | A CORPORATION | aaa.jpg | SALES MANAGEMENT SYSTEM, WEB SYSTEM, PERSONNEL SYSTEM | SYSTEM CONSTRUCTION, MAINTENANCE CHECK |
| E002 | MR. I | A CORPORATION | bbb.jpg | SALES MANAGEMENT SYSTEM, WEB SYSTEM | MAINTENANCE CHECK |
| ... | | | | | |
| E011 | MR. KA | B CORPORATION | kka.jpg | PRODUCTION MANAGEMENT SYSTEM | MAINTENANCE CHECK |
| E012 | MR. KI | B CORPORATION | kkb.jpg | PRODUCTION MANAGEMENT SYSTEM | FAILURE RECOVERY |
| ... | | | | | |
| E101 | MR. MA | G CORPORATION | mma.jpg | WEB SERVER | OBSERVATION TOUR |
| ... | | | | | |

| ENTR-ANCE NUMBER | VISITOR ID | SCHEDULED ENTRANCE DATE AND TIME | TARGET SYSTEM | TASK ITEM | COMPAN-ION | ENTRANCE RECORD | RENTED TERMINAL ID | FINGER PRINT INFORMATION |
|---|---|---|---|---|---|---|---|---|
| 101901 | E001 | 2016/10/19 11:00 | SALES MANAGEMENT SYSTEM, WEB SYSTEM | SYSTEM CONSTRUCTION | YES | 2016/10/19 11:05 | AAA | FDSWFS FVSCSC |
| 101902 | E002 | 2016/10/19 11:00 | SALES MANAGEMENT SYSTEM, WEB SYSTEM | | YES | 2016/10/19 11:00 | BBB | XSFFFSG FSGSC |
| 101911 | E011 | 2016/10/19 15:00 | PRODUCTION MANAGEMENT SYSTEM | INSTALLATION WORK | NO | 2016/10/19 15:00 | CCC | ZSFTTSG FEDEGH |
| ... | ... | | | | | | | |
| 102001 | E001 | 2016/10/20 14:00 | PERSONNEL SYSTEM | MAINTENANCE CHECK | NO | 2016/10/20 15:00 | AAA | XSFFFSG FSGSC |
| 102011 | E012 | 2016/10/20 12:00 | PRODUCTION MANAGEMENT SYSTEM | FAILURE RECOVERY | NO | 2016/10/20 11:30 | DDD | SADCVSK RXSXS |
| ... | ... | | | | | | | |
| 102501 | E101 | 2016/10/25 10:00 | WEB SERVER | OBSERVATION TOUR | NO | - | - | - |
| ... | ... | | | | | | | |

| AFFILIATION | TARGET SYSTEM | INSTALLATION AREA | SERVER ROOM | RACK NUMBER | DOCUMENT |
|---|---|---|---|---|---|
| A CORPORATION | SALES MANAGEMENT SYSTEM | X AREA | A BUILDING-A | 1192 | XX MANUAL |
| A CORPORATION | WEB SYSTEM | Y AREA | F BUILDING-A | 1333 | XY MANUAL |
| A CORPORATION | PERSONNEL SYSTEM | Z AREA | C BUILDING-C | 2016 | SYSTEM CONFIGURATION DIAGRAM |
| B CORPORATION | PRODUCTION MANAGEMENT SYSTEM | X AREA | F BUILDING-C | 1582 | WW MANUAL |
| G CORPORATION | WEB SERVER | Y AREA | B BUILDING-A | 1600 | ZZ MANUAL |
| ... | | | | | |

| FUNCTION ID | VISITOR ID | TASK ITEM | ENTRANCE REQUEST | ENTRANCE PURPOSE CERTIFICATE | SECURITY CARD | IN-DC ROAD GUIDANCE 1 | IN-DC ROAD GUIDANCE 2 | CALL FUNCTION | FILE SERVER | NOTIFICATION FUNCTION | LOCATION DETECTION | VIRUS CHECK | CAMERA PHOTOGRAPHY | ... |
|---|---|---|---|---|---|---|---|---|---|---|---|---|---|---|
| F001 | E001 | SYSTEM CONSTRUCTION | ○ | ○ | ○ | ○ | ○ | ○ | ○ | ○ | ○ | ○ | × | |
| F101 | E001 | MAINTENANCE CHECK | ○ | ○ | ○ | ○ | ○ | ○ | ○ | ○ | ○ | ○ | ○ | |
| F201 | E011 | INSTALLATION WORK | ○ | ○ | ○ | ○ | ○ | ○ | × | ○ | ○ | × | ○ | |
| F211 | E012 | FAILURE RECOVERY | ○ | ○ | ○ | ○ | × | ○ | ○ | ○ | ○ | ○ | × | |
| F301 | E101 | OBSERVATION TOUR | ○ | ○ | ○ | ○ | × | × | × | ○ | ○ | × | × | |
| ... | ... | | | | | | | | | | | | | |

| AREA ID | AREA | OPERATION PERMITTED AREA | ... |
|---|---|---|---|
| X-1 | IN BUILDING (BEFORE ENTRANCE) | - | |
| X-2 | RECEPTION | INLET DOOR 1 | |
| X-3 | SHARED AREA | METAL DETECTOR | |
| X-4 | IN DC AREA | METAL DETECTOR | |
| ... | | | |
| A-1 | A BUILDING SERVER ROOM A | CORRIDOR/ANTERIOR ROOM/SEVER ROOM | |
| ... | | | |
| B-1 | B BUILDING SERVER ROOM A | CORRIDOR/ANTERIOR ROOM/SEVER ROOM | |
| ... | | | |
| C-3 | C BUILDING SERVER ROOM C | CORRIDOR/ANTERIOR ROOM/SEVER ROOM | |
| ... | | | |
| F-1 | F BUILDING SERVER ROOM A | CORRIDOR/ANTERIOR ROOM/SEVER ROOM | |
| ... | | | |
| F-3 | F BUILDING SERVER ROOM C | CORRIDOR/ANTERIOR ROOM/SEVER ROOM | |
| ... | | | |
| Y-1 | IN BUILDING (AFTER EXIT) | INLET DOOR 1 | |
| ... | | | |
| Z-1 | OUTSIDE SITE | - | |
| | | | |

225

| GATE ID | SECURITY GATE NAME | ADJACENT GATE 1 | ADJACENT GATE 2 | ... |
|---------|--------------------|-----------------|-----------------|-----|
| Gate-000 | GATE 0 | Gate-001 | - | |
| Gate-001 | GATE 1 | Gate-002 | Gate-000 | |
| Gate-002 | GATE 2 | Gate-003 | Gate-001 | |
| Gate-003 | GATE 3 | Gate-004 | Gate-002 | |
| ... | | | | |

FIG. 10

| APPLICATION NAME | FILE NAME | ... |
|---|---|---|
| ENTRANCE REQUEST | application.apk | |
| ENTRANCE PURPOSE CERTIFICATE | certificate.apk | |
| SECURITY CARD | card.apk | |
| IN-DC ROAD GUIDANCE 1 | navi1.apk | |
| IN-DC ROAD GUIDANCE 2 | navi2.apk | |
| CALL FUNCTION | phone.apk | |
| ... | | |

| AREA ID | ENTRANCE REQUEST | ENTRANCE PURPOSE CERTIFICATE | SECURITY CARD | IN-DC ROAD GUIDANCE 1 | IN-DC ROAD GUIDANCE 2 | CALL FUNCTION | FILE SERVER | NOTIFICATION FUNCTION | LOCATION DETECTION | VIRUS CHECK | CAMERA PHOTOGRAPHY | ... |
|---|---|---|---|---|---|---|---|---|---|---|---|---|
| X-1 | × | × | × | × | × | × | × | × | × | ○ | × | |
| X-2 | ○ | ○ | ○ | ○ | × | ○ | ○ | ○ | ○ | × | × | |
| X-3 | ○ | × | ○ | ○ | × | ○ | ○ | ○ | ○ | × | × | |
| X-4 | ○ | × | ○ | ○ | × | ○ | ○ | ○ | ○ | × | × | |
| ... | | | | | | | | | | | | |
| A-1 | × | × | ○ | ○ | ○ | △ | ○ | ○ | ○ | × | ◇ | |
| ... | | | | | | | | | | | | |
| B-1 | × | × | × | × | × | × | × | × | ○ | × | × | |
| ... | | | | | | | | | | | | |
| C-3 | × | × | × | × | × | × | × | × | ○ | × | × | |
| ... | | | | | | | | | | | | |
| F-1 | × | × | ○ | ○ | ○ | △ | ○ | ○ | ○ | × | ◇ | |
| ... | | | | | | | | | | | | |
| F-3 | × | × | × | × | × | × | × | × | ○ | × | × | |
| ... | | | | | | | | | | | | |
| Y-1 | ○ | × | × | × | × | × | × | ○ | ○ | ○ | ○ | |
| ... | | | | | | | | | | | | |
| Z-1 | × | × | × | × | × | × | × | ○ | ○ | × | × | |
| ... | | | | | | | | | | | | |

FIG. 11B

| AREA ID | ENTRANCE REQUEST | ENTRANCE PURPOSE CERTIFICATE | SECURITY CARD | IN-DC ROAD GUIDANCE 1 | IN-DC ROAD GUIDANCE 2 | CALL FUNCTION | FILE SERVER | NOTIFICATION FUNCTION | LOCATION DETECTION | VIRUS CHECK | CAMERA PHOTOGRAPHY | ... |
|---|---|---|---|---|---|---|---|---|---|---|---|---|
| X-1 | × | × | × | × | × | × | × | × | × | ○ | × | |
| X-2 | ○ | ○ | ○ | ○ | × | ○ | ○ | ○ | ○ | × | × | |
| X-3 | ○ | × | ○ | ○ | × | ○ | ○ | ○ | ○ | × | × | |
| X-4 | ○ | × | ○ | ○ | × | ○ | ○ | ○ | ○ | × | × | |
| ... | | | | | | | | | | | | |
| A-1 | × | × | × | × | × | × | × | × | ○ | × | × | |
| ... | | | | | | | | | | | | |
| B-1 | × | × | × | × | × | × | × | × | ○ | × | × | |
| ... | | | | | | | | | | | | |
| C-3 | × | × | ○ | ○ | ○ | △ | ○ | ○ | ○ | × | ◇ | |
| ... | | | | | | | | | | | | |
| F-1 | × | × | × | × | × | × | × | × | ○ | × | × | |
| ... | | | | | | | | | | | | |
| F-3 | × | × | × | × | × | × | × | × | ○ | × | × | |
| ... | | | | | | | | | | | | |
| Y-1 | ○ | × | × | × | × | × | × | ○ | ○ | ○ | ○ | |
| ... | | | | | | | | | | | | |
| Z-1 | × | × | × | × | × | × | × | ○ | ○ | × | × | |
| ... | | | | | | | | | | | | |

FIG. 11C

| AREA ID | ENTRANCE REQUEST | ENTRANCE PURPOSE CERTIFICATE | SECURITY CARD | IN-DC ROAD GUIDANCE 1 | IN-DC ROAD GUIDANCE 2 | CALL FUNCTION | FILE SERVER | NOTIFICATION FUNCTION | LOCATION DETECTION | VIRUS CHECK | CAMERA PHOTOGRAPHY | ... |
|---|---|---|---|---|---|---|---|---|---|---|---|---|
| X-1 | × | × | × | × | × | × | × | × | × | ○ | × | |
| X-2 | ○ | ○ | ○ | ○ | × | ○ | ○ | ○ | ○ | × | × | |
| X-3 | ○ | × | ○ | ○ | × | ○ | ○ | ○ | ○ | × | × | |
| X-4 | ○ | × | ○ | ○ | × | ○ | ○ | ○ | ○ | × | × | |
| ... | | | | | | | | | | | | |
| A-1 | × | × | × | × | × | × | × | × | ○ | × | × | |
| ... | | | | | | | | | | | | |
| B-1 | × | × | × | × | × | × | × | × | ○ | × | × | |
| ... | | | | | | | | | | | | |
| C-3 | × | × | × | × | × | × | × | × | ○ | × | × | |
| ... | | | | | | | | | | | | |
| F-1 | × | × | × | × | × | × | × | × | ○ | × | × | |
| ... | | | | | | | | | | | | |
| F-3 | × | × | ○ | ○ | ○ | △ | ○ | ○ | ○ | × | ◇ | |
| ... | | | | | | | | | | | | |
| Y-1 | ○ | × | × | × | × | × | × | ○ | ○ | ○ | ○ | |
| ... | | | | | | | | | | | | |
| Z-1 | × | × | × | × | × | × | × | ○ | ○ | × | × | |
| ... | | | | | | | | | | | | |

| VISITOR ID | ALREADY PASSED GATE | ... |
|---|---|---|
| E001 | Gate-000<br>Gate-001<br>Gate-002 | |
| ... | | |

323

… (US 10,262,485 B2)

PORTABLE TERMINAL AND FUNCTION MANAGEMENT SYSTEM

CROSS-REFERENCE TO RELATED APPLICATION

This application is based upon and claims the benefit of priority of the prior Japanese Patent Application No. 2017-073102, filed on Mar. 31, 2017, the entire contents of which are incorporated herein by reference.

FIELD

The embodiments discussed herein are related to a portable terminal, a function management system, and a non-transitory computer-readable recording medium having stored therein a function management program.

BACKGROUND

In an environment requiring high security such as a data center, a portable terminal such as a smart phone may be used for an authentication process to pass a gate. There has been known a technique that selectively installs an application (application software), which may be used only in a specific area, in a portable terminal according to the purpose when using the portable terminal for the authentication process.

For example, there has been known a technique that causes a security device such as an integrated circuit (IC) card to touch a gate device such that a terminal application setting command and a terminal application are installed in a portable phone only in an area that has normally passed such that a gate application of the gate device designates an application to be executed in a specific area. In this technique, the security device is provided with a central processing unit (CPU) that is a controller configured to install a terminal application in the portable phone which is a terminal. The terminal application installed in the portable phone includes an authentication application to perform an authentication process on the gate device, and a terminal application designated by the gate device when the authentication application succeeds in the authentication with the gate device.

In addition, there has also been known a portable terminal that is capable of managing a plurality of function restrictions in a batch and enables the function restrictions to be automatically performed in accordance with the start of another event after activating a specific application function. For each application, the portable terminal has a management table that designates an operation mode to be set to the portable terminal during the execution of the application or in a specific event (condition). Further, the portable terminal automatically changes the operation mode of the portable terminal (e.g., rejects an incoming call) in the specific event of an application such as a browser (e.g., when browsing a specific web page) that runs based on the management table. Therefore, the portable terminal may automatically switch the operation mode according to the situation without depending on individual change and control of the operation mode by the user.

In addition, there has been known a portable computer configured to restrict information operation by the computer depending on a use area when using the computer by moving the use area (location) in order to prevent leakage of the information. The computer is configured to restrict different information operations for a plurality of partitioned use areas, respectively. Further, a server connected with the computer via a network has information corresponding to the use areas of the computer, and the information to be provided to the computer may be restricted depending on the use areas of the computer.

Related technologies are disclosed in, for example, International Publication Pamphlet No. WO 2005/073843, and Japanese Laid-Open Patent Publication Nos. 2003-288275 and 2008-160753.

SUMMARY

According to an aspect of the embodiments, provided is a portable terminal including: a memory; and a processor coupled to the memory and configured to: set a function associated with a visitor to be executable, and determine whether or not execution of a function is permitted using information on a location of the portable terminal when an instruction to execute the function is received.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a visitor database (DB);

FIG. 4 is a diagram illustrating an example of an entrance schedule DB;

FIG. 5 is a diagram illustrating an example of an authority DB;

FIG. 6 is a diagram illustrating an example of an application function DB;

FIG. 7 is a diagram illustrating an example of an area DB;

FIG. 10 is a diagram illustrating an example of an application storage unit;

FIG. 11A is a diagram illustrating an example of a determination condition storage unit;

FIG. 11B is a diagram illustrating another example of the determination condition storage unit;

FIG. 11C is a diagram illustrating another example of the determination condition storage unit;

DESCRIPTION OF EMBODIMENTS

In a data center or the like, the areas where entrance is permitted or functions for which an operation is permitted, are often different from visitor to visitor. In addition, even for the same visitor, permitted functions may vary depending on the timing and purpose of visit. However, in the related art, the functions of a portable terminal are not changed depending on a visitor or entrance timing.

Hereinafter, exemplary embodiments of a portable terminal, a function management system, a function management method, and a function management program will be described in detail with reference to the drawings. However, the present disclosure is not limited by the exemplary embodiments. In addition, respective exemplary embodiments described below may be appropriately combined in a range that does not cause contradiction.

First Exemplary Embodiment

Figure 1:
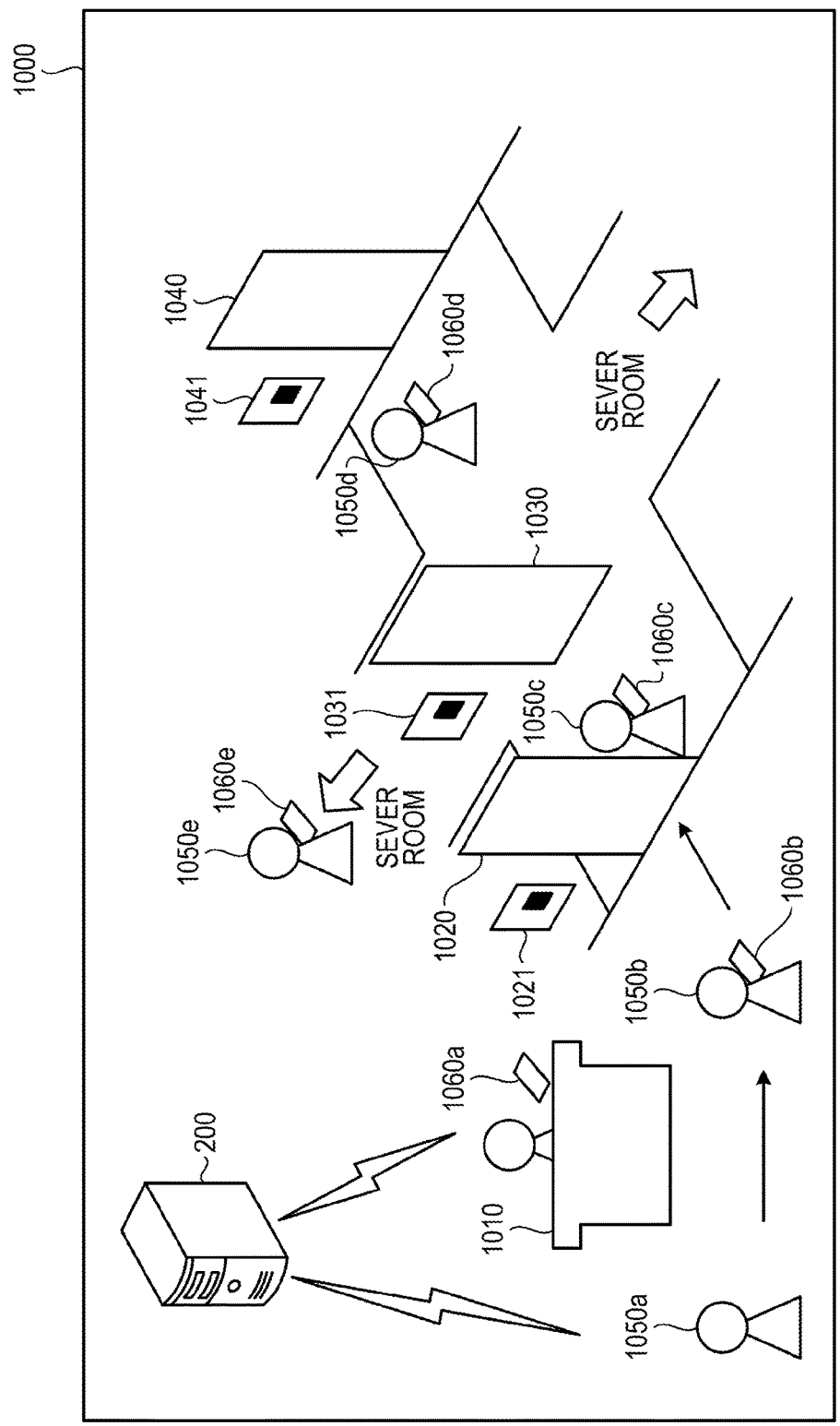
FIG. 1 is a diagram illustrating an example of a data center.

FIG. 1 is a diagram illustrating an example of a data center. In FIG. 1, a user 1050 who wishes to enter the data center 1000 accesses in advance a function management server 200 which will be described below, and performs an entrance registration process for a server room A of the data center 1000. In addition, FIG. 1, users 1050a to 1050d indicate the locations of the same user 1050 at different time points, and portable terminals 1060a to 1060d also indicate the locations of the same portable terminal 1060 at different time points.

When the entrance registration process succeeds, the function management server 200 sets an application function, which is determined according the visitor 110 and the entrance purpose of the user 1050, to the portable terminal 1060, such as a smart phone or a mobile phone. Then, the portable terminal 1060, to which the application function is set, is rented to the user from the reception 1010 of the data center 1000.

The user 1050 who has rented the portable terminal 1060 sequentially passes security gates 1020, 1030, and 1040 of the data center 1000 and enters the server room A. Further, the user 1050 opens the security gates by making the portable terminal 1060 touch the authentication apparatuses 1021, 1031, and 1041 of the security gates using, for example, the application function of a security card provided in the portable terminal 1060.

In the meantime, the portable terminal 1060e obtains the location information and detects that the user 1050e intends to enter a server room B instead of a server room A to be entered. In this case, the portable terminal 1060e provides a notification to the user 1050e, for example, by outputting an alarm.

In addition, when the user leaves the data center 1000, the portable terminal 1060 invalidate the application function and delete the stored information at the time of being returned to the reception 1010.

[Functional Block]

Figure 2:
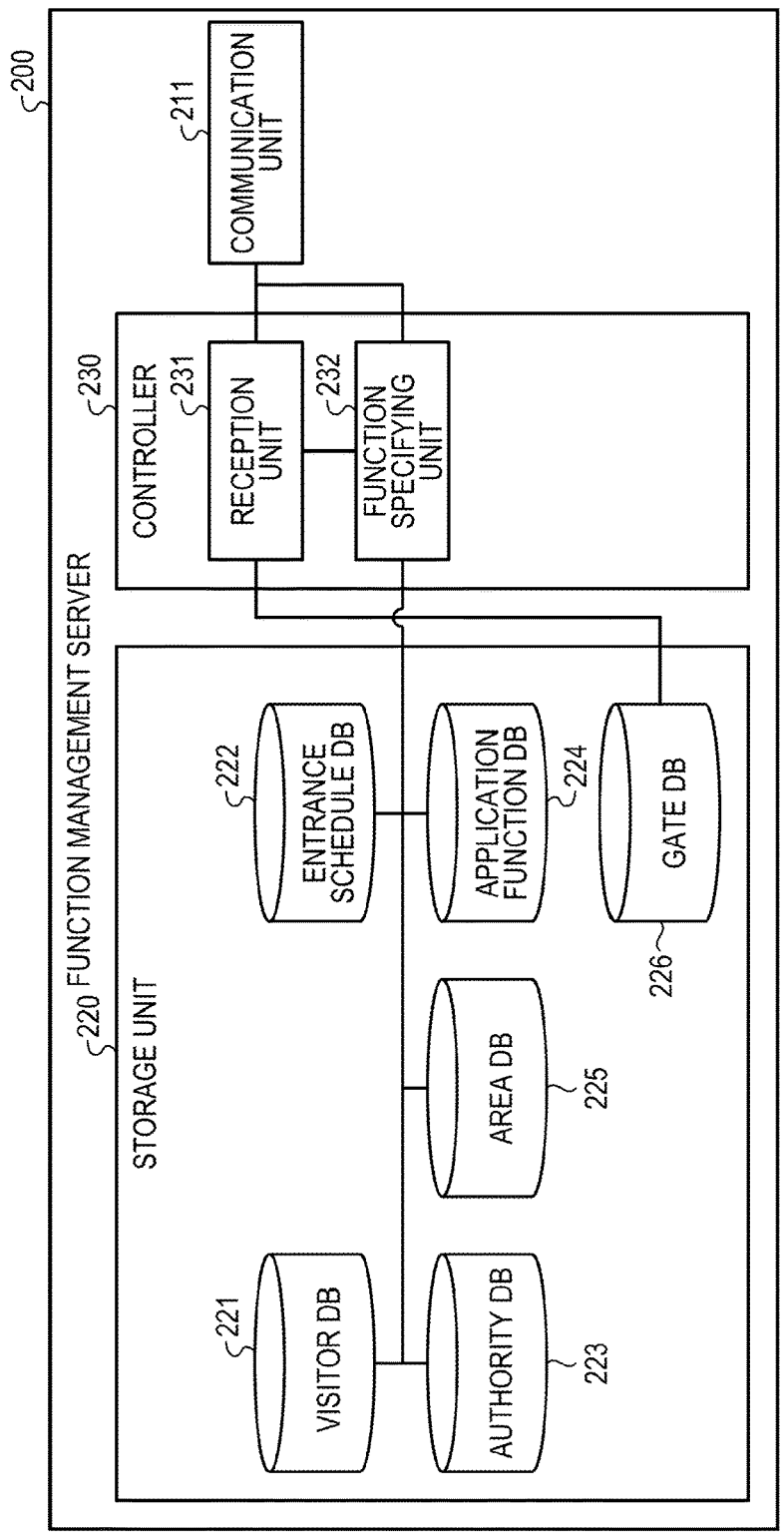
FIG. 2 is a diagram illustrating an example of a function management server.

First, an example of a function management server 200 according to this exemplary embodiment will be described with reference to FIG. 2. FIG. 2 is a diagram illustrating an example of the function management server. As illustrated in FIG. 2, the function management server 200 according to this exemplary embodiment includes a communication unit 211, a storage unit 220, and a controller 230.

The communication unit 211 controls with a portable terminal 300 and other computers such as a security gate or the like, via a network (not illustrated) regardless of whether it is wired or wireless).

The storage unit 220 stores various pieces of data such as a program executed by the controller 230. In addition, the storage unit 220 stores information of respective DBs, such as a visitor DB 221, an entrance schedule DB 222, an authority DB 223, an application function DB 224, an area DB 225, and a gate DB 226. The storage unit 220 corresponds to a semiconductor memory device such as a random access memory (RAM), a read only memory (ROM), or a Flash Memory, or corresponds to a storage device such as a hard disk drive (HDD).

The visitor DB 221 stores information on a visitor to the data center 1000. FIG. 3 is a diagram illustrating an example of a visitor DB. As illustrated in FIG. 3, the visitor DB 221 stores a "visitor ID" (identifier) which is an identifier uniquely identifying the visitor, to be associated with a "visitor name," an "affiliation," a "face photograph," a "target system," and a "task item." The information stored in the visitor DB 221 is input in advance by, for example, an administrator (not illustrated) of the function management server 200.

In FIG. 3, the "visitor name" and the "affiliation" store the name of the visitor and the organization to which the visitor belongs, respectively. The "face photograph" stores the file name of the image data of the face photograph of the visitor. The "target system" and the "task item" store the target system to be worked and the task permitted to the visitor, respectively.

The visitor DB 221 illustrated in FIG. 3 stores, for example, that Mr. A having the visitor ID of "E001" belongs to "A Corporation" and is permitted for a "system construction" and a "maintenance and check" associated with a "sales management system," a "web system" and a "personnel management system." Further, the visitor DB 221 stores that the file name of the image data of the photographed face of "Mr. A" is "aaa.jpg."

Next, the entrance schedule DB 222 stores information on the entrance schedule for the visitor stored in the visitor DB 221. FIG. 4 is a diagram illustrating an example of the entrance schedule DB. As illustrated in FIG. 4, the entrance schedule DB 222 store an "visitor ID," "scheduled entrance date and time," a "target system," a "task item," a "companion," an "entrance record," a "rented terminal ID," and "fingerprint information" to be associated with an "entrance number." The information stored in the entrance schedule DB 222 is input by a reception unit 231 and a function specifying unit 232 which will be described later. In FIG. 4, the "visitor ID," the "scheduled entrance date and time," the "target system," the "task item," and the "companion" is stored at the time of requesting entrance. In addition, the "entrance record," the "rented terminal ID," and the "fingerprint information" are stored at the time of actual entrance of the visitor.

In FIG. 4, the "access number" is an identifier that uniquely identifies the entrance schedule. The "scheduled entrance date and time" stores the scheduled entrance date and time registered at the time of requesting the entrance. The "companion" stores whether or not the visitor accompanies any other person. The "entrance record" stores a date and time at which the visitor actually entered. The "rented terminal ID" stores an identifier that uniquely identifies the rented portable terminal 300 that is rented to the visitor at the time of entrance. The "fingerprint information" stores information on the fingerprint that is biometric information of the visitor. Herein, the entrance schedule DB 222 may store the biometric information of the visitor other than the fingerprint information, or does may not store the biometric information therein.

For example, the entrance schedule DB 222 illustrated in FIG. 4 stores that a visitor having a visitor ID "E001" is scheduled to enter at "11:00 AM on Oct. 19, 2016" in the record of the access number "101901." Further, the entrance schedule DB 222 stores that the visitor having the visitor ID "E001" is scheduled to enter together with a companion for the purpose of "system construction" associated with the "sales management system" and the "web system." Further, the entrance schedule DB 222 stores that the visitor having the visitor ID "E001" actually entered at "11:05 AM on Oct. 19, 2016," rented a rented terminal ID "AAA," and registered fingerprint information.

Next, the authority DB 223 stores information on an area, a server room, a rack, and a document, to which access is permitted in each target system. FIG. 5 is a diagram illustrating an example of the authority DB. As illustrated in FIG. 5, the authority DB 223 stores a "affiliation," a "target system," an "installation area," a "server room," a "rack number," and a "document" to be associated with each other. In addition, the information stored in the authority DB 223 is input in advance by, for example, an administrator of the function management server 200.

In FIG. 5, the "installation area," the "server room," and the "rack number" store the location where the server of the target system of each affiliation is installed. The "document" store a document to which access is permitted for a visitor who performs a task associated with the target system of each affiliation.

The authority DB 223 illustrated in FIG. 5 store, for example, that the server of the "sales management system" of "A Corporation" is installed at the rack number "1192" installed in a server room "A-A" of the "X area." The authority DB 223 illustrated in FIG. 5 store that a visitor who performs a task on the "sales management system" of "A Corporation" is able to access an "XX manual."

Next, the application function DB 224 stores information on the functions of the application to be set to the rented portable terminal 300 that is rented by the visitor. FIG. 6 is a diagram illustrating an example of the application function DB. As illustrated in FIG. 6, the application function DB 224 stores an "visitor ID," a "task item," an "entrance request," a "entrance purpose certificate," a "security card," a "in-dc road guidance 1," and a "in-dc road guidance 2." In addition, the application function DB 224 further stores a "call function," a "file server," a "notification function," a "location detection," a "virus check," and a "camera photography." Further, the information stored in the application function DB 224 is input in advance by, for example, an administrator of the function management server 200.

The "function ID" illustrated in FIG. 6 is an identifier that uniquely identifies the combinations of the application functions associated with the "visitor ID" and the "task item." In FIG. 6, each of the items such as the "entrance request" and the "camera photography" etc. indicates the function of an applications to be set to the portable terminal 300. For example, the application function DB 224 stores that all the application functions other than the "camera shooting" is set to the rented portable terminal 300 that is rented by the user when the visitor of "E001" makes an entrance for the purpose of "system construction."

In FIG. 6, the "access request" indicates a request to be used when the visitor requests entrance. The "entrance purpose certificate" indicates an application associated with the certificate to be presented to the reception when the visitor makes an entrance. The "security card" indicates an application of the security card function to be presented when the visitor passes a gate. The "in-dc road guidance 1" and the "in-dc road guidance 2" indicate applications associated with a navigation function indicating the order of roads in different areas in the DC, respectively. Here, the "in-dc road guidance 1" indicates the order of roads to enter each server building, and the "in-dc road guidance 2" indicates the order of roads within each server building.

In FIG. 6, the "call function" indicates an application associated with the call function with the outside using the portable terminal 300. The "file server" indicates an application to be used to access the file server in which a document is stored. The "notification function" indicates an application associated with a function to receive a notification from the outside to the portable terminal 300. The "virus check" indicates a virus check application of the portable terminal 300. The "camera photography" indicates an application associated with the photography function using a camera (not illustrated) equipped in the portable terminal 300.

Next, the area DB 225 stores each area within the data center and an area in which the operation of the portable terminal 300 is permitted in each region to be associated with each other. FIG. 7 is a diagram illustrating an example of the area DB. As illustrated in FIG. 7, the area DB 225 stores the "area" and the "operation permitted area" to be associated with an "area ID" that is an identifier uniquely identifying the areas in the data center. In addition, the information stored in the area DB 225 is input in advance by, for example, an administrator of the function management server 200.

In FIG. 7, the "area" indicates a specific area in the data center, and the "operation permitted area" indicates an area in which the operation of the portable terminal 300 is permitted within the specific area. For example, the area having an area ID "X-1" indicates an area located within the building where the data center is established, but before entering the data center. The area DB 225 further stores that the operation of an application of the portable terminal 300 is not permitted anywhere in the area "X-1." In the meantime, the area DB 225 stores that the operation of an application of the portable terminal 300 is permitted in the "inlet door 1" in the "reception area" of the area ID "X-2."

Figures 8, 9:
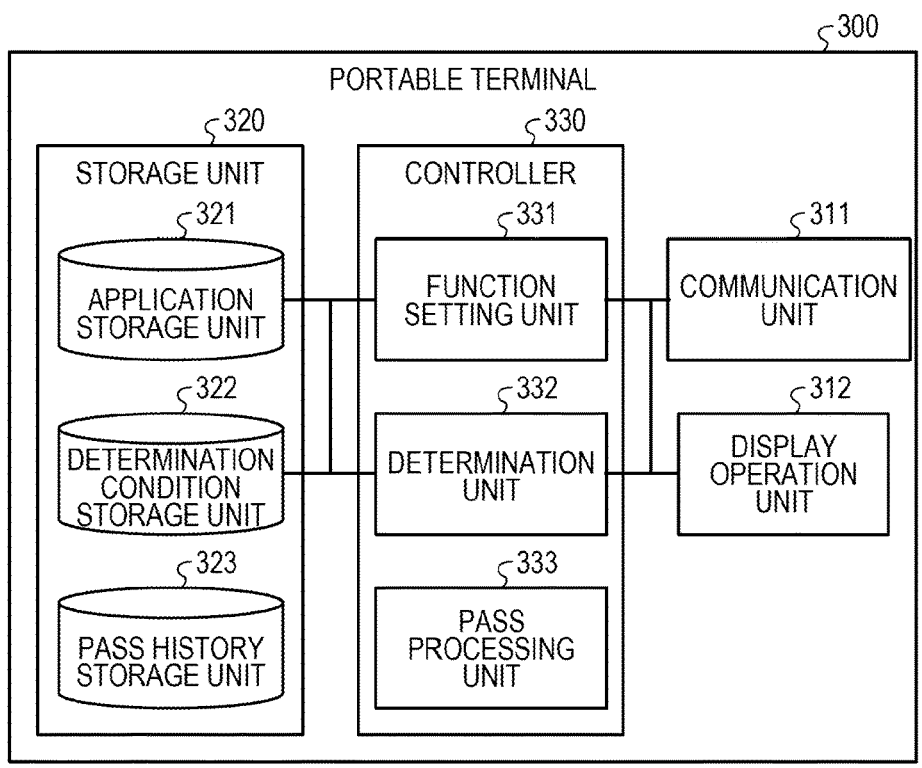
FIG. 8 is a diagram illustrating an example of a gate DB.
FIG. 9 is a diagram illustrating an example of a portable terminal.

Next, the gate DB 226 stores information on a gate installed in the data center 1000. FIG. 8 is a diagram illustrating an example of the gate DB. As illustrated in FIG. 8, the gate DB 226 stores a "security gate name," an "adjacent gate 1," and an "adjacent gate 2" to be associated with a "gate ID" that is an identifier uniquely identifying the gates in the data center. In addition, the information stored in the gate DB 226 is input in advance by, for example, an administrator of the function management server 200.

In FIG. 8, the "security gate name" stores the name of the security gate of each gate ID. The "adjacent gate 1" and the "adjacent gate 2" store the gate ID of security gates adjacent to the gates. For example, the gate DB 226 illustrated in FIG. 8 stores that the gate having the gate ID "Gate-000" is adjacent only to the gate having the gate ID "Gate-001." In addition, the gate DB 226 illustrated in FIG. 8 stores that the gate having the gate ID "Gate-002" is adjacent to each of the gates having the gate IDs "Gate-001" and "Gate-003."

Returning to FIG. 2, the controller 230 is a processing unit that is responsible for overall processing of the function management server 200. The controller 230 is implemented by executing a program stored in an internal storage device using a RAM as a task area by, for example, a CPU, a Micro Processing Unit (MPU), etc. Further, the controller 230 may be implemented by an integrated circuit such as an application specific integrated circuit (ASIC) or a field programmable gate array (FPGA), etc.

The controller 230 includes a reception unit 231 and a function specifying unit 232. The reception unit 231 and the function specifying unit 232 are examples of electronic circuits included in the processor or examples of processes executed by the processor.

The reception unit 231 receives the entrance request to be made by the visitor. The reception unit 231 receives the entrance request, including, for example, the information on each of the visitor ID, the task item, the designation of the target system to be worked, the scheduled entrance date and time, and the presence/absence of a companion, and transmits the received information to the function specifying unit 232.

Further, when an authentication request is made from the security gate, the reception unit 231 outputs the gate IDs of "adjacent gate 1" and "adjacent gate 2" of the security gate with reference to the gate DB 226.

Next, the function specifying unit 232 specifies the functions of the application to be set to the rented portable terminal 300, which is rented by the visitor, using the information received from the reception unit 231. In addition, the function specifying unit 232 is an example of a setting unit.

First, the function specifying unit 232 determines whether or not a an entrance requester has a rightful authority using the visitor ID, the task item, and the designation of the target system to be worked, with reference to the visitor DB 221 and the authority DB 223.

For example, when an entrance request for the purpose of "maintenance check" on the "personnel system" is received from "Mr. I" having the visitor ID "E002," the function specifying unit 232 specifies that the purpose of entrance is not registered in the visitor DB 221 illustrated in FIG. 3. In this case, the function specifying unit 232 determines that the entrance requester does not have a rightful authority, and suppress an application from being set to the portable terminal 300.

In the meantime, when it is determined that the entrance requester has a rightful authority, the function specifying unit 232 specifies the functions of the application to be set to the portable terminal 300 rented by the visitor using the information received from the reception unit 231, with reference to the application function DB 224. For example, when the purpose of the entrance request for the purpose of the "system construction" on the "personnel system" is received from "Mr. A" having the visitor ID "E001," the function specifying unit 232 specifies the functions of the application to be set to the rented portable terminal 300 of "Mr. A," with reference to the application function DB 224 illustrated in FIG. 6. Then, the function specifying unit 232 transmits the information on the specified application functions, including conditions on whether or not to execute the application functions, to the portable terminal 300 via the communication unit 211.

Next, an example of a portable terminal 300 according to this exemplary embodiment will be described with reference to FIG. 9. FIG. 9 is a diagram illustrating an example of a portable terminal. As illustrated in FIG. 9, the portable terminal 300 according to this exemplary embodiment includes a communication unit 311, a display operation unit 312, a storage unit 320, and a controller 330. In the following description, in the case where visitors renting the portable terminal 300, the task items for the portable terminals 300, etc., are different from each other, the portable terminal 300 may be illustrated as portable terminals 300a to 300c to be distinguished from each other.

The communication unit 311 controls communication with other computers such as the function management server 200 or the like via a network (not illustrated) regardless whether it is wired or wireless.

The display operation unit 312 serves as an input device configured to accept various operations from the user of the portable terminal 300 and a display device configured to display various pieces of information. The display operation unit 312 is implemented by, for example, a touch panel in which an input device and a display device are integrated with each other. In addition, the display operation unit 312 may be implemented by an input device such as a keyboard or a mouse, and a display device such as a liquid crystal display. The display operation unit 312 outputs an operation input by the user to the controller 330 as operation information.

The storage unit 320 stores various data such as a program executed by the controller 330. Further, the storage unit 320 includes an application storage unit 321, a determination condition storage unit 322, and a pass history storage unit 323.

The application storage unit 321 stores information on an application installed in the portable terminal 300. FIG. 10 is a diagram illustrating an example of the application storage unit. As illustrated in FIG. 10, the application storage unit 321 stores an "application name," which is the name of an application installed in the portable terminal 300, to be associated with a "file name" of the application. For example, the application storage unit 321 stores that an application called as an "entrance request" having the file name of "application.apk" is installed in the portable terminal 300. Further, the information stored in the application storage unit 321 is input by, for example, a function setting unit 331 which will be described later.

Next, the determination condition storage unit 322 stores a condition to determine whether or not a function is executed by an application installed in the portable terminal 300, for each area. In addition, the information stored in the determination condition storage unit 322 is input by, for example, the function setting unit 331 as described later.

The information stored in the determination condition storage unit 322 varies depending on combinations of, for example, the "visitor ID" and the "task item." The information stored in the determination condition storage unit 322 will be described with reference to FIGS. 11A to 11C. FIG. 11A is a diagram illustrating an example of the determination condition storage unit. As illustrated in FIG. 11A, the determination condition storage unit 322 stores in which area the execution of each of the application functions of the "entrance request" and the "camera photography" is permitted and in which area the execution of each of the application functions of the "entrance request" and the "camera photography" is rejected. FIG. 11A illustrates an example of the determination condition storage unit 322 of the portable terminal 300a, which is rented when "Mr. A" performs a "system construction" task on the "sales management system" or the "web system" of the "A Corporation."

In FIG. 11A, in the areas indicated by "X," it is stored that the functions of the application are non-executable in the areas, and in the areas indicated by "O," it is stored that the functions of the application are executable in the areas. In FIG. 11A, in the areas indicated by "Δ" and " ◊ ," it is stored that only some of the application functions are executable in the areas.

For example, the determination condition storage unit 322 illustrated in FIG. 11A stores that in the area "X-1," execution of only the "virus check" is permitted and execution of all of the other application functions are rejected. Likewise, the determination condition storage unit 322 illustrated in FIG. 11A stores that in the areas "B-1," "C-3," and "F-3," execution of only the "location detection" is permitted and execution of all of the other application functions are rejected. In addition, since execution of only the "location detection" is permitted, it is possible to detect that the visitor intends to enter a non-permitted area, and to alert the visitor.

Further, the determination condition storage unit 322 illustrated in FIG. 11A stores, for example, that in the area "A-1," only the incoming call of the "call function" is executable but the outgoing call is non-executable. In addition, the determination condition storage unit 322 illustrated in FIG. 11A stores that execution of the "camera photography" is permitted only in a predetermined range in the area "A-1."

Next, the contents of the determination condition storage unit 322 corresponding to the other combinations of the "visitor ID" and the "task item" will be described with reference to FIGS. 11B and 11C. FIGS. 11B and 11C are diagrams illustrating other examples of the determination condition storage unit. FIG. 11B is an example of the determination condition storage unit 322 of the portable terminal 300b is rented when "Mr. A" performs the "maintenance check" task on the "personnel system" of the "A Corporation."

The determination condition storage unit 322 illustrated in FIG. 11B stores that in the area "C-3," execution of the "security card," the "in-dc road guidance 1," and the "in-dc road guidance 2," the "file server," and the "notification function" is permitted, in addition to the "location detection." Further, the determination condition storage unit 322 illustrated in FIG. 11B stores that in the area "C-3," the "call function" is permitted only in the incoming call and the "camera photography" is permitted only in a predetermined range. In other words, according to this exemplary embodiment, the determination condition storage unit 322 stores that even if the portable terminal 300 is rented by the same visitor, the permitted application functions differ from each other when the entrance purposes and the target servers to be worked differ from each other.

Next, FIG. 11C is an example of the determination condition storage unit 322 of the portable terminal 300c rented when "Mr. Ka" performs a task of "system installation work" on a "production management system" of the "Corporation B." Unlike the determination condition storage unit 322 illustrated in FIGS. 11A and 11B, the determination condition storage unit 322 illustrated in FIG. 11C stores that in the area "F-3," execution of the application functions such as the "security card" is permitted, in addition to the "location detection."

Next, a pass history storage unit 323 stores information on the security gate that the portable terminal 300 has passed. In addition, the information stored in the pass history storage unit 323 is input by, for example, a pass processing unit 333 which will be described later.

Figures 12, 13:
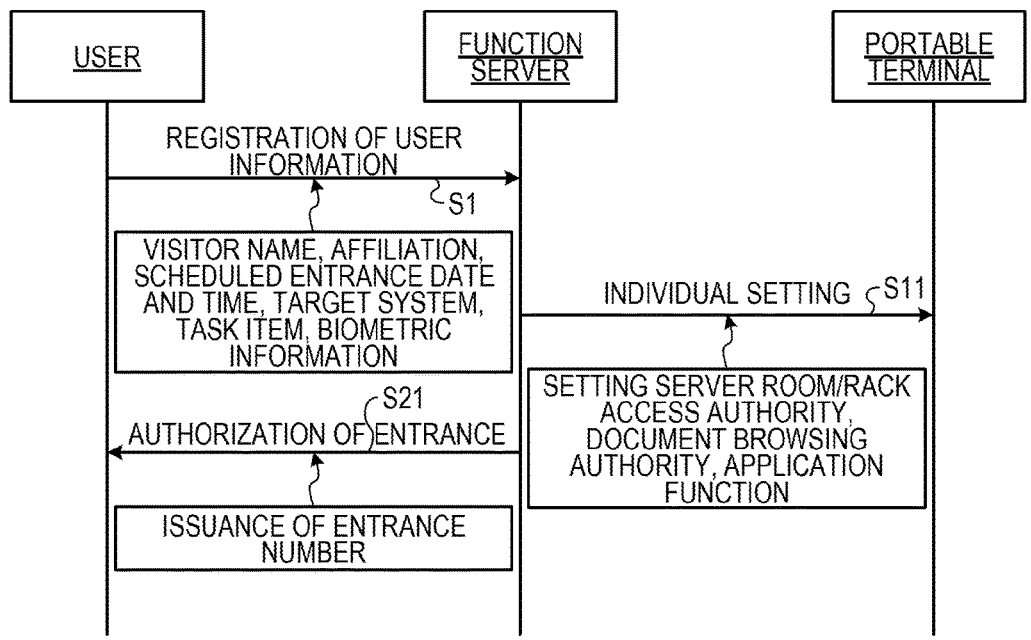
FIG. 12 is a diagram illustrating an example of a pass history storage unit.
FIG. 13 is a sequence diagram illustrating an example of an entrance registration process.

FIG. 12 is a diagram illustrating an example of the pass history storage unit. As illustrated in FIG. 12, the pass history storage unit 323 stores an "already passed gate" indicating the security gate that the portable terminal 300 has passed to be associated with the "visitor ID" of the visitor who has rented the portable terminal 300. For example, the pass history storage unit 323 as illustrated in FIG. 12 stores that the visitor having the visitor ID "E001" and carrying the rented portable terminal 300 has passed the gates of the gate IDs "Gate-000," "Gate-001," and "Gate-002."

Returning back to FIG. 9, the controller 330 is a processing unit that is responsible for the overall processing of the portable terminal 300. The controller 330 is implemented when a program stored in an internal storage device is executed by, for example, the CPU or the MPU using a RAM as a task area. Further, the controller 330 may be implemented by, for example, an integrated circuit such as an ASIC or an FPGA. The controller 330 includes a function setting unit 331, a determination unit 332, and a pass processing unit 333. Here, the function setting unit 331, the determination unit 332, and the pass processing unit 333 are examples of electronic circuits included in the processor or examples of processes executed by the processor.

The function setting unit 331 receives information on the application functions from the function management server 200 via the communication unit 311. The function setting unit 331 installs an application corresponding to the information on the received application functions, and store information on the installed application in the application storage unit 321. In addition, the function setting unit 331 receives conditions to determine whether or not the installed application functions are executable from the function management server 200, and store the received conditions in the determination condition storage unit 322.

Further, for example, when detecting that the portable terminal 300 has been returned to the reception in the data center 1000, the function setting unit 331 invalidates the functions of the installed application and delete the stored information.

Next, the determination unit 332 determines whether or not the application functions installed in the portable terminal 300 are executable, with reference to the determination condition storage unit 322. For example, when receiving an instruction to execute the application functions from the visitor via the display operation unit 312, the determination unit 332 obtains the location information and specifies the area where the portable terminal 300 is currently located. Even though the determination unit 332 uses the location information obtained from, for example, a known global positioning system (GPS) receiver, the method for specifying the location information is not limited thereto. For example, the determination unit 332 may specify the location information by receiving signals transmitted from the gates of respective areas, or may specify the location information based on the passed gates.

Next, the determination unit 332 determines whether or not an application function for which an execution instruction has been received is executable in the current area, with reference to the determination condition storage unit 322. For example, in the case where an instruction to execute the "in-dc road guidance 1" application function is received from the visitor, the determination unit 332 disables the execution of the application function of the "in-dc road guidance 1" when it is determined that the current area of the portable terminal 300 is "X-1." In this case, the determination unit 332 may cause the display operation unit 312 to display a message indicating that the execution of the application function of the "in-dc road guidance 1" is disabled. In the meantime, when it is determined that the current area of the portable terminal 300 is "A-1," the determination unit 332 executes the application function of the "in-dc road guidance 1."

In addition, the timing at which the determination unit 332 determines whether or not an application function is executable is not limited to the case where an instruction to execute the application function is received from the visitor. For example, when an incoming call or an incoming electronic mail was received from the outside, the determination unit 332 may determine whether or not the call function or the notification reception function is executable.

Next, the pass processing unit 333 manages the passing of the security gate using the application function of the security card installed in the portable terminal 300. When the portable terminal 300 passes the security gate, the pass processing unit 333 performs an authentication process on the security gate using the application function of the security card. When the authentication process on the security gate succeeds to pass the gate, the pass processing unit 333 registers the gate ID of the passed security gate in the pass history storage unit 323.

Further, the pass processing unit 333 outputs the pass history stored in the pass history storage unit 323 to the security gate at the time of performing the authentication process on the security gate. The security gate determines whether or not the immediately preceding gate ID in the received pass history is registered in the "adjacent gate 1" or the "adjacent gate 2" with reference to, for example, the gate DB 226 of the function management server 200. In this case, when it is not determined that the immediately preceding gate ID in the received pass history is registered in the "adjacent gate 1" or the "adjacent gate 2," the authentication process on the security gate is failed.

[Process Flow]

Figure 14:
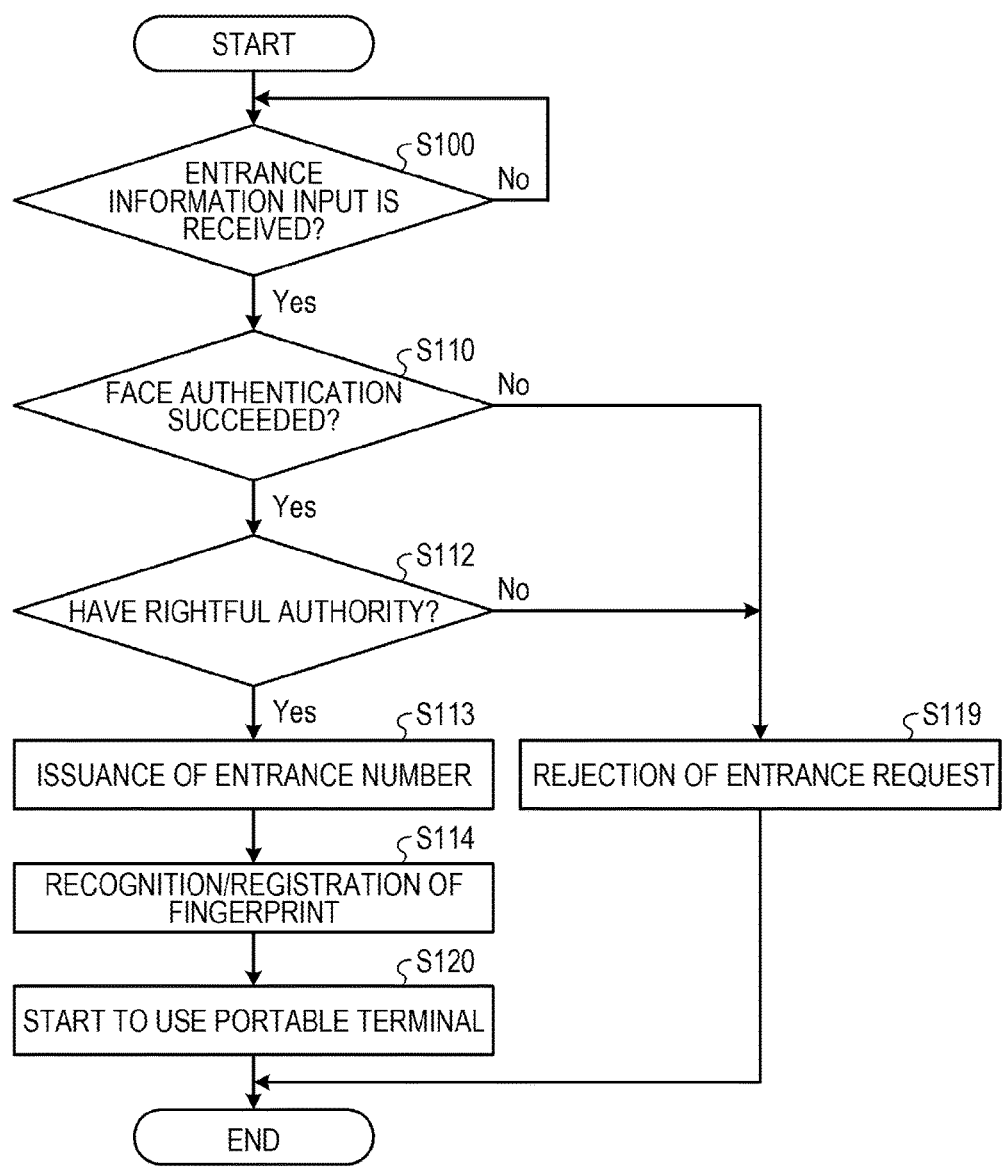
FIG. 14 is a flowchart illustrating an example of an entrance registration process.
Figure 15:
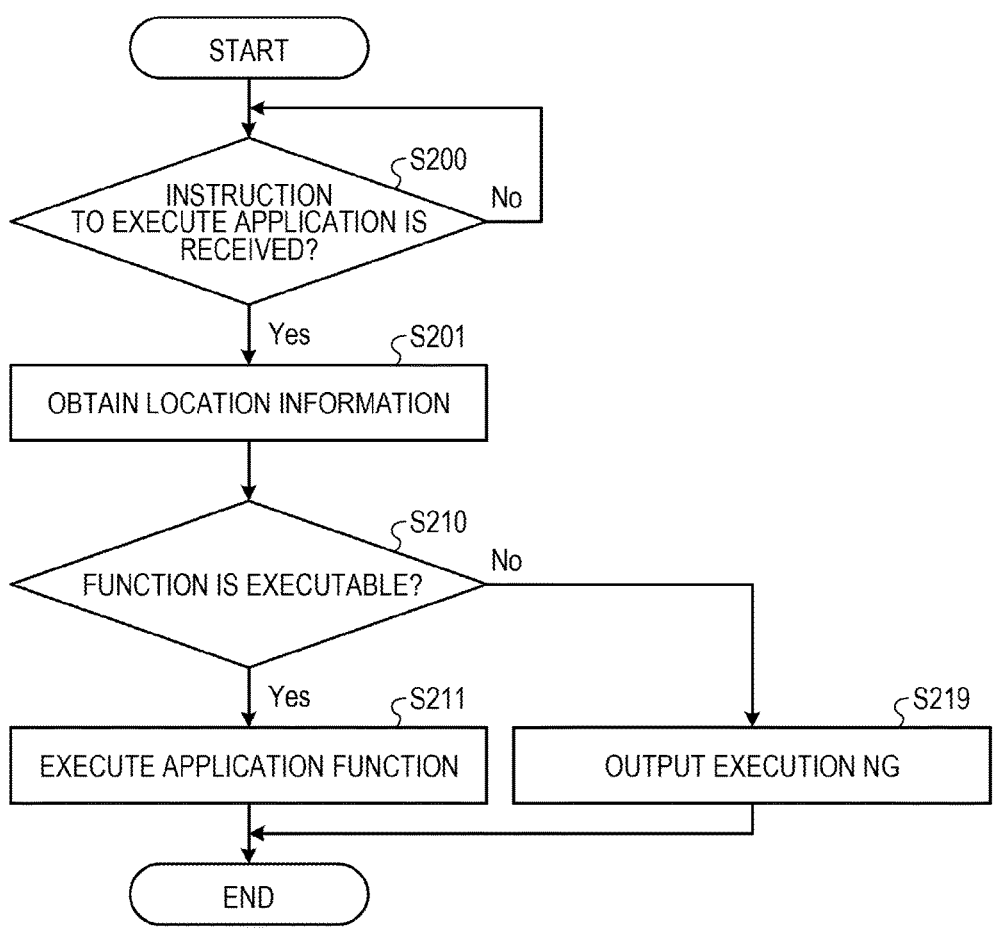
FIG. 15 is a flowchart illustrating an example of an application execution process.

Next, the processes according to this exemplary embodiment will be described with reference to FIGS. 13 to 15. FIG. 13 is a sequence diagram illustrating an example of an access registration process. As illustrated in FIG. 13, a user who wishes to enter the data center 1000 accesses the function management server 200 and registers user information including a visitor name, an affiliation, a scheduled entrance date and time, a target system, a task item, and biometric information (S1). The function specifying unit 232 of the function management server 200 performs setting of a server room/rack access authority, setting of a document browsing authority, and setting of application functions to the portable terminal 300, using the registered user information (S11). Then, the reception unit 231 of the function management server 200 authorizes the access of the user who has registered the information, and issues an entrance number (S21).

Next, the details of the access registration process will be described. FIG. 14 is a flowchart illustrating an example of the access registration process. As illustrated in FIG. 14, the reception unit 231 of the function management server 200 waits until the access information input is received from the user (not illustrated) via the communication unit 211 (S100: No). When it is determined that the access information input is received (S100: Yes), the reception unit 231 determines whether or not biometric authentication on the user succeeded (S110). For example, the reception unit 231 performs a face authentication process on the user.

When it is determined that the face authentication process failed (S110: No), the reception unit 231 rejects the access request (S119), and terminates the process. In the meantime, when it is determined that the face authentication process succeeded (S110: Yes), the reception unit 231 outputs the entrance information to the function specifying unit 232.

When receiving the output of the entrance information, the function specifying unit 232 determines whether or not the visitor has a rightful authority with reference to the visitor DB 221 and the authority DB 223 (S112). When it is determined that the visitor does not have a rightful authority (S112: No), the function specifying unit 232 proceeds to S119. In the meantime, when it is determined that the visitor has a rightful authority (S112: Yes), the function specifying unit 232 issues the entrance number on the user (S113). Then, the reception unit 231 recognizes the fingerprint of the user and registers the fingerprint information in the entrance schedule DB 222 (S114). Then, the function specifying unit 232 sets the application functions of the portable terminal 300 so as to allow the portable terminal 300 to be used (S120), and terminates the process.

Next, an application execution process of the portable terminal 300 according to this exemplary embodiment will be described with reference to FIG. 15. FIG. 15 is a flowchart illustrating an example of an application execution process. As illustrated in FIG. 15, the determination unit 332 of the portable terminal 300 waits until an application execution instruction is received (S200: No). When the application execution instruction is received (S200: Yes), the pass processing unit 333 obtains the location information on the portable terminal 300 (S201).

Next, the determination unit 332 determines whether or not a function is executable at the location of the obtained location information with reference to the determination condition storage unit 322 (S210). When it is determined that the function is non-executable (S210: No), the determination unit 332 outputs information indicating execution NG via the display operation unit 312 (S219), and terminates the process. In the meantime, when it is determined that the function is executable (S210: Yes), the determination unit 332 instructs that the application function be executed (S211), and terminates the process.

Figure 16:
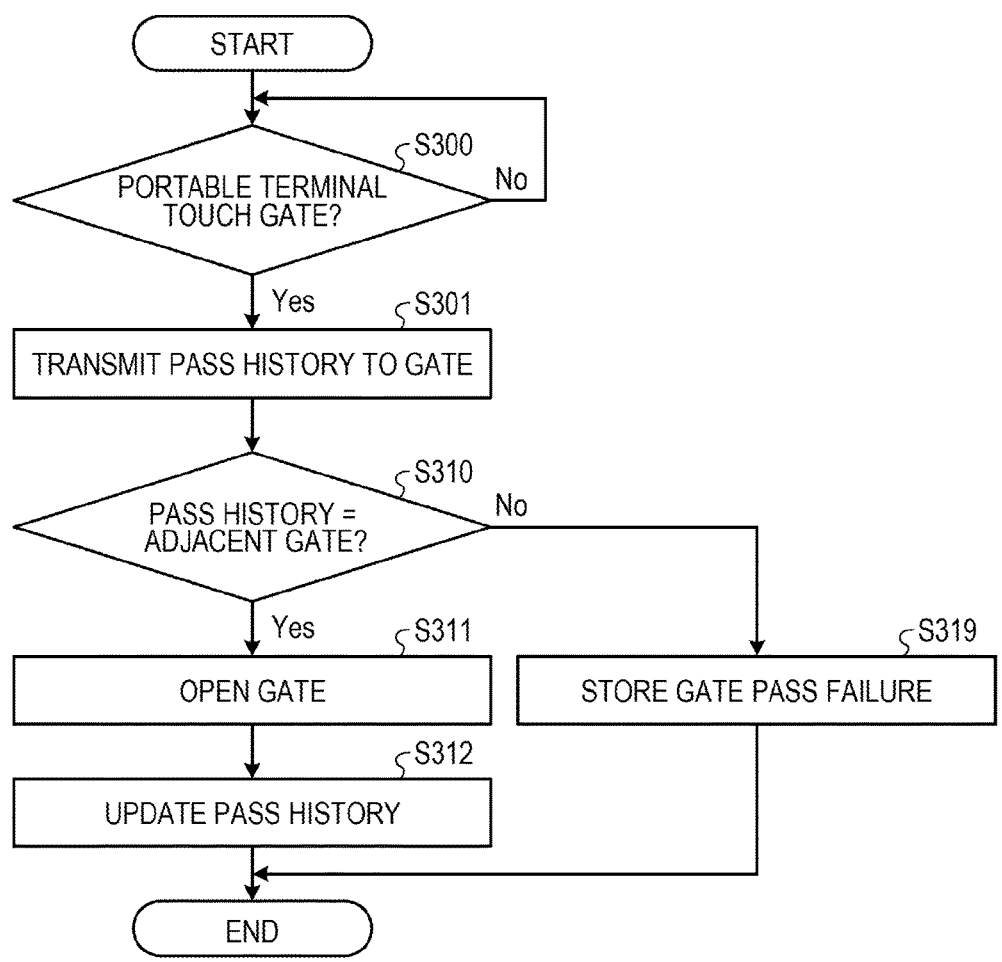
FIG. 16 is a flowchart illustrating an example of a gate determination process.

Next, a gate determination process according to this exemplary embodiment will be described with reference to FIG. 16. FIG. 16 is a flowchart illustrating an example of a gate determination process. As illustrated in FIG. 16, the pass processing unit 333 of the portable terminal 300 waits until the portable terminal 300 touches the security gate (S300: No). When the portable terminal 300 touches the security gate (S300: Yes), the pass processing unit 333 reads a gate pass history from the pass history storage unit 323, and transmits the gate pass history to the security gate (S301).

Subsequently, the security gate determines whether or not the latest gate pass history is associated with the adjacent gate (S310). When it is determined that the latest gate pass history is not associated with the adjacent gate (S310: No), the security gate transmits information indicating that passing the gate is disabled to the portable terminal 300. In this case, the pass processing unit 333 stores the information indicating that passing the gate is disabled in the pass history storage unit 323 (S319), and terminates the process.

In the meantime, when it is determined that the latest gate pass history is associated with the adjacent gate (S310: Yes), the security gate opens the gate (S311) and transmits information indicating the gate is opened to the portable terminal 300. In this case, the information indicating that it is authorized to pass the gate is transmitted to the portable terminal 300. The pass processing unit 333 stores the gate ID of the security gate in the pass history storage unit 323 (S312), and terminates the process.

[Effect]

As described above, the portable terminal according to this exemplary embodiment is set to be capable of executing a function associated with a visitor. When the portable terminal according to this exemplary embodiment receives an instruction to execute the set function, the portable terminal determines whether or not execution of the function is permitted using the information on the location of the portable terminal. Accordingly, for example, the portable terminal rented to the visitor may be provided with a function according to a purpose or a situation.

The portable terminal according to this exemplary embodiment is set to execute a function specified in accordance with an entrance purpose of a visitor. Accordingly, different functions may be set in accordance with the entrance purpose even if the portable terminal is rented to the same visitor.

Furthermore, the portable terminal according to this exemplary embodiment is set to be capable of executing the above-described functions at the time of entrance of the visitor, and the functions is made non-executable at the time of exit of the visitor. Accordingly, the functions of the portable terminal may be made effective only until the visitor exits.

Second Exemplary Embodiment

Although an exemplary embodiment has been described above, the present disclosure may be carried out in various aspects other than the aforementioned embodiment. For example, in the function management server 200, a part of the functional blocks may be provided to an external computer. For example, the function management server 200 may not have the gate DB 226, and instead, each security gate may be configured to hold the ID of an adjacent gate. Alternatively, the determination condition storage unit 322 may be held not in the portable table 300, but in the function management server 200, and the portable terminal 300 may be configured such that whenever an instruction to execute an application is received, the portable terminal 300 inquires the function management server 200 of whether or not the application is executable.

[System]

In addition, among the respective processes described in the embodiments, all or some of the processes described as being automatically performed may be manually performed. Alternatively, all or some of the processes described as being manually performed may be automatically performed by a known method. Further, the processing procedures, control procedures, specific names, and information including various data or parameters, which are illustrated in the specification or the drawings, may be arbitrarily varied unless otherwise specified.

Furthermore, the respective elements of the respective illustrated apparatuses are functionally conceptual ones, and do not necessarily have to be physically configured as illustrated. In other words, the specific forms of the distribution and integration of the respective apparatuses may not be limited to those illustrated in the drawings. In other words, all or some thereof may be functionally or physically distributed and integrated in arbitrary units, in accordance with various loads, use situations, or the like. In addition, all or some arbitrary ones of the processing functions performed in each apparatus may be implemented by a CPU and a program read and executed by the CPU, or may be implemented as hardware by wired logic.

[Hardware Configuration]

Figure 17:
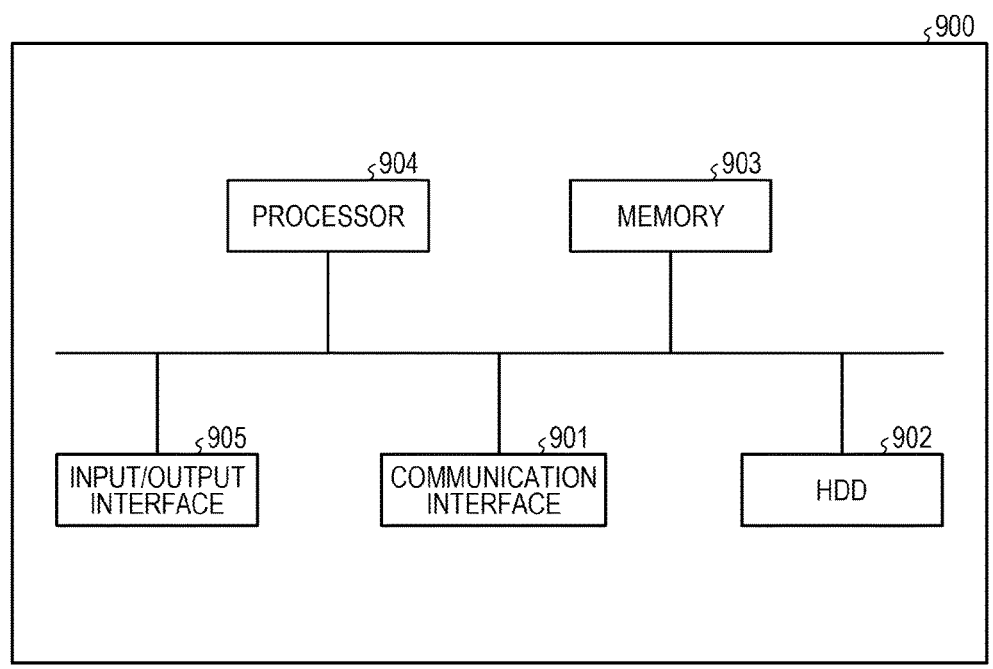
FIG. 17 is a diagram illustrating an example of a hardware configuration of a computer.

FIG. 17 is a diagram illustrating an example of a hardware configuration of a computer. As illustrated in FIG. 17, the computer 900 includes a communication interface 901, an HDD 902, a memory 903, a processor 904, and an input/output interface 905. In the following, the portable terminal 300 will be described as an example, but the function management server 200 may also be implemented by the same computer.

The communication interface 901 corresponds to the communication unit 311 described in the descriptions of each functional unit, and is, for example, a network interface card. The HDD 902 stores a program or a DB that operates the processing unit described in the descriptions of each functional unit.

The processor 904 reads, from the HDD 902, a program for executing the same processes as those of respective processing units described in the descriptions of respective functional units, and deploys the program to the memory 903 so as to operate the processes for executing the respective functions illustrated in FIG. 9 or the like. That is, these processes execute the same functions as those of the function setting unit 331, the determination unit 332, and the pass processing unit 333 of the portable terminal 300. The input/output interface 905 corresponds to the display operation unit 312 described in the descriptions of each functional unit.

As described above, the computer 900 operates as the portable terminal 300 that executes a function management method by reading and executing a program. In addition, the portable terminal 300 may implement the functions described in the aforementioned embodiments by reading a program from a recording medium by a medium reading device and executing the program. Further, the programs according to other exemplary embodiments are not limited to those executed by the portable terminal 300. For example, these exemplary embodiments may be similarly applied to the case where another computer or server executes a program, or the case where they cooperate to execute a program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A portable terminal, comprising:
   a memory; and
   a processor coupled to the memory and the processor configured to:
   set a function of the portable terminal associated with a visitor to be executable, use of the function of the portable terminal being permitted according to the visitor in advance; and
   determine whether or not execution of the function is permitted using information on a location of the portable terminal when an instruction to execute the function is received at the portable terminal.

2. The portable terminal according to claim 1, wherein the processor sets a function specified according to an entrance purpose of the visitor to be executable.

3. The portable terminal according to claim 1, wherein the processor sets the function to be executable at a time of entrance of the visitor, and sets the function to be non-executable at a time of exit of the visitor.

4. A non-transitory computer-readable recording medium having stored therein a function management program for causing a computer to execute a process, the process comprising:

setting a function of the portable terminal associated with a visitor to be executable, use of the function of the portable terminal being permitted according to the visitor in advance; and determining whether or not execution of the function is permitted using information on a location of a portable terminal when an instruction to execute the function is received at the portable terminal.

5. A function management system, comprising:
a function management server; and
a portable terminal,
the function management server includes:
a first memory configured to store a visitor and a function, use of which is permitted according to the visitor, to be associated with each other; and
a first processor coupled to the first memory and the first processor configured to set the stored function associated with the visitor to the portable terminal when an entrance request to the specific area including information on the visitor is received, and
the portable terminal includes:
a second memory; and
a second processor coupled to the second memory and the second processor configured to:
set a function of the portable terminal associated with the visitor to be executable; and
determine whether or not execution of the function is permitted using information on a location of the portable terminal when an instruction to execute the function is received at the portable terminal.

6. The portable terminal of claim 5, wherein the function of the portable terminal associated with the visitor is set to be executable according to an entrance timing of the visitor to a first security gate of a plurality of security gates provided in a path to a specific area.

7. The portable terminal of claim 6, wherein whether or not the execution of the function is permitted is determined using the information on the location of the portable terminal in the path to the specific area after the visitor enters the first security gate of the plurality of security gates.

8. The non-transitory computer-readable recording medium of claim 4, wherein the setting sets the function of the portable terminal associated with the visitor to be executable according to an entrance timing of the visitor to a first security gate of a plurality of security gates provided in a path to a specific area.

9. The non-transitory computer-readable recording medium of claim 8, wherein the determining determines whether or not the execution of the function is permitted using the information on the location of the portable terminal in the path to the specific area after the visitor enters the first security gate of the plurality of security gates.

10. The function management system of claim 1, wherein the function of the portable terminal associated with the visitor is set to be executable according to an entrance timing of the visitor to a first security gate of a plurality of security gates provided in a path to a specific area.

11. The function management system of claim 10, wherein whether or not the execution of the function is permitted is determined using the information on the location of the portable terminal in the path to the specific area after the visitor enters the first security gate of the plurality of security gates.

* * * * *